(12) United States Patent
Nagata et al.

(10) Patent No.: US 11,915,202 B2
(45) Date of Patent: Feb. 27, 2024

(54) REMOTE MEETING AND CALENDAR SUPPORT FOR THE IN-VEHICLE INFOTAINMENT UNIT

(71) Applicant: Toyota Motor Engineering & Manufacturing North America, Inc., Plano, TX (US)

(72) Inventors: Katsumi Nagata, Foster City, CA (US); Makoto Tanaka, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 48 days.

(21) Appl. No.: 17/165,786

(22) Filed: Feb. 2, 2021

(65) Prior Publication Data

US 2022/0245596 A1  Aug. 4, 2022

(51) Int. Cl.
*G06Q 10/1093* (2023.01)
*H04M 3/56* (2006.01)
*G06Q 10/107* (2023.01)

(52) U.S. Cl.
CPC ....... *G06Q 10/1095* (2013.01); *G06Q 10/107* (2013.01); *H04M 3/565* (2013.01)

(58) Field of Classification Search
CPC ......... G06F 3/165; G06F 3/167; G10L 15/00; H04L 12/1818; H04L 12/1822; H04L 12/1827; H04L 9/3226; G01C 21/26; G06Q 10/109; G06Q 10/1093; G06Q 10/1095

See application file for complete search history.

(56) References Cited

U.S. PATENT DOCUMENTS

| 10,609,515 | B1 * | 3/2020 | Bender ................ H04W 4/024 |
| 10,630,843 | B1 * | 4/2020 | Rosenberg .......... H04L 63/0428 |
| 10,666,901 | B1 * | 5/2020 | Zhang ..................... H04L 65/80 |
| 2012/0246229 | A1 * | 9/2012 | Carr ...................... H04M 3/565 |
| | | | 709/204 |

(Continued)

FOREIGN PATENT DOCUMENTS

| GB | 2536718 A | * | 9/2016 | ......... G01C 21/3453 |
| GB | 2566794 A | * | 3/2019 | ......... G01C 21/3453 |

OTHER PUBLICATIONS

Seung, Yousuk; Leng, Quan; Dong, Wei; Qiu, Lili; and Zhang, Yin: "Randomized routing in multi-party internet video conferencing", 2014 IEEE 33rd International Performance Computing and Communications Conference (IPCCC) (pp. 1-8) (Year: 2014).*

(Continued)

*Primary Examiner* — William S Brockington, III
*Assistant Examiner* — Sarjit S Bains
(74) *Attorney, Agent, or Firm* — SNELL & WILMER LLP

(57) ABSTRACT

Methods, systems, and apparatus for an in-vehicle infotainment platform for a vehicle. The in-vehicle infotainment platform includes a memory and an electronic control unit. The memory is configured to store meeting information including video conferencing information or audio conferencing information. The electronic control unit is coupled to the memory. The electronic control unit is configured to automatically connect to a video conference using the video conferencing information or automatically connect to an audio conference using the audio conferencing information.

20 Claims, 6 Drawing Sheets

(56) References Cited

U.S. PATENT DOCUMENTS

| | | | |
|---|---|---|---|
| 2013/0342637 A1* | 12/2013 | Felkai | H04N 7/14 |
| | | | 348/E7.083 |
| 2014/0309806 A1* | 10/2014 | Ricci | G05D 23/1917 |
| | | | 701/1 |
| 2016/0044129 A1* | 2/2016 | Bergmann | H04L 67/5681 |
| | | | 455/406 |
| 2017/0041356 A1* | 2/2017 | Nelson | H04N 7/142 |
| 2018/0137470 A1* | 5/2018 | Donnelly | H04W 4/44 |
| 2019/0132265 A1* | 5/2019 | Nowak-Przygodzki | |
| | | | H04M 3/527 |
| 2021/0089026 A1* | 3/2021 | Bender | H04W 4/44 |

OTHER PUBLICATIONS https://www.apple.com/ios/carplay/.

* cited by examiner

REMOTE MEETING AND CALENDAR SUPPORT FOR THE IN-VEHICLE INFOTAINMENT UNIT

BACKGROUND

Field

This disclosure relates to providing meeting and calendar support for an in-vehicle infotainment unit of a vehicle.

Description of the Related Art

As mobile devices and vehicle information systems have become more integrated via applications, the vehicle information systems may allow for the mobile devices to connect and share information, such as calendar notices, audio or video files, music playlists, Short Message Service (SMS), and/or text or chat messages. Additionally, the vehicle information systems may connect with a mobile device and use applications or features of the mobile device, such as a phone feature to call or otherwise interact with another device. These interactions, however, require user input to coordinate the different interactions between the different applications, and thus, the occupant or driver may become distracted.

For example, while the vehicle is in motion, a driver and/or occupant is unable to automatically connect or join to a conference or phone call without user input. The vehicle information system may connect with a mobile device and obtain information from the mobile device that indicates that there is an upcoming meeting. The vehicle information system may notify the driver that there is an upcoming meeting by displaying a notification on the user interface. The driver, however, must still act on the notification, which requires user input. And thus, the driver is unable to join or to notify other participants of the meeting without user input.

Accordingly, there is a need for a system, apparatus, device and/or method for further integrating and improving the in-vehicle infotainment system to automatically connect and join to conference calls.

SUMMARY

In general, one aspect of the subject matter described in this disclosure may be embodied in an in-vehicle infotainment platform for a vehicle. The in-vehicle infotainment platform includes a memory and an electronic control unit. The memory is configured to store meeting information including video conferencing information or audio conferencing information. The electronic control unit is coupled to the memory. The electronic control unit is configured to automatically connect to a video conference using the video conferencing information or automatically connect to an audio conference using the audio conferencing information.

These and other embodiments may optionally include one or more of the following features. The electronic control unit may be configured to determine whether to connect to the video conference or connect to the audio conference based on the meeting information. The meeting information may include a date and a time of a meeting. The electronic control unit may be configured to determine that a current date and a current time is within a threshold time of the date and the time of the meeting. The electronic control unit may be configured to automatically connect to the video conference using the video conferencing information when the meeting information includes the video conferencing information.

The video conferencing information may include a meeting identifier and an indication of a video conferencing platform. The electronic control unit may be configured to identify the meeting identifier. The electronic control unit may be configured to select a link or run an application to connect to the video conference using the video conferencing platform. The electronic control unit may be configured to connect to the video conference using the meeting identifier. The in-vehicle infotainment platform may include a display. The display may be configured to output video associated with the video conference. The in-vehicle infotainment platform may include a speaker. The speaker may be configured to output audio associated with the video conference. The in-vehicle infotainment platform may include a microphone. The microphone may be configured to input audio associated with the video conference.

The electronic control unit may automatically connect to the audio conference using the audio conferencing information when the meeting information includes audio conferencing information. The audio conferencing information may include a phone number. The electronic control unit may be configured to cause a mobile device to dial the phone number to automatically connect to the audio conference using the audio conferencing information. The electronic control unit may be configured to enter the passcode to connect to the audio conference.

In another aspect, the subject matter may be embodied in an in-vehicle infotainment system for a vehicle. The in-vehicle infotainment system includes a memory. The memory is configured to store meeting information including video conferencing information or audio conferencing information from a calendar stored in a user device or on a server, such as on a cloud application. The in-vehicle infotainment platform includes an electronic control unit. The electronic control unit is coupled to the memory. The electronic control unit is configured to determine whether to connect to the video conference or connect to the audio conference based on the meeting information. The electronic control unit is configured to automatically connect to a video conference using the video conferencing information or an audio conference using the audio conferencing information based on the determination.

In another aspect, the subject matter may be embodied in a method for connecting to a video conference using an in-vehicle infotainment platform of a vehicle. The method includes obtain, by a processor, meeting information that includes a date or a time of a meeting and video conferencing information including a meeting identifier and an indication of a video conferencing platform. The method includes determining that a current date and a current time is within a threshold time of the date and the time of the meeting. The method includes automatically connecting to a video conference using the meeting identifier and the video conferencing platform.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, devices, apparatuses, platforms and/or methods for automatically connecting to a conference call. Particular embodiments of the subject matter described in this disclosure may be implemented to realize one or more of the following advantages. The in-vehicle infotainment system ("infotainment system") obtains meeting information including video conferencing information and/or audio conferencing information. The infotainment system may determine that the driver, passenger or other occupant (or "user") of the vehicle is traveling to a destination but will not reach the destination before the meeting begins. The infotainment system may notify the other participants of the meeting that the user will be late to the meeting and/or may automatically connect the user to the video and/or audio conference associated with the meeting when there is video conferencing and/or audio conferencing information available. This automatically connects the user to the video and/or audio conference without the user having to provide user input, which minimizes any distractions to the user while the vehicle is in motion.

Other benefits and advantages include the capability to fully automate the login of the video and/or audio conference. For example, the infotainment system may automatically identify the login information, such as the meeting identifier or passcode identifier, for the corresponding video and/or audio conference, and the infotainment system may input the login information to automatically connect to the video and/or audio conference. Moreover, the infotainment system may be compatible with various audio and/or video conferencing applications. The infotainment system may automatically connect to the audio and/or video conference regardless of the application being used to hold the audio and/or video conference.

Figure 1:
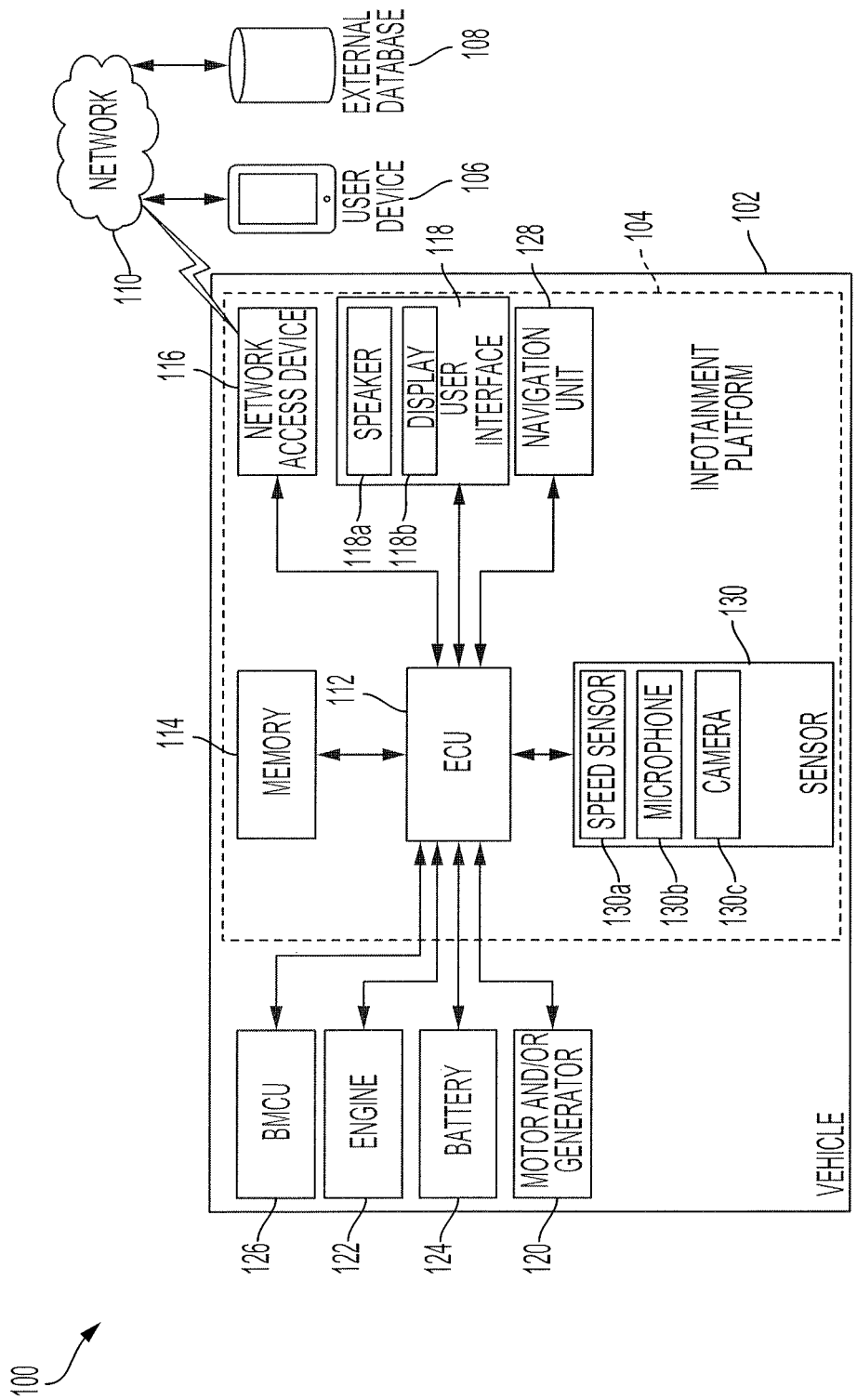
FIG. 1 is a block diagram of an example in-vehicle infotainment system according to an aspect of the invention.

FIG. 1 is a block diagram of an infotainment system 100. The infotainment system 100 includes an infotainment platform 104 and/or one or more user devices 106, such as a mobile device, a smartphone, a tablet, a laptop, a personal computer, or other personal device. The infotainment system 100 may couple, connect to, or include an external database 108 and/or one or more other vehicle components of the vehicle 102. The infotainment system 100 may have a network 110 that links the infotainment platform 104, the one or more user devices 106, and/or one or more other vehicle components. The network 110 may be a local area network (LAN), a wide area network (WAN), a cellular network, the Internet, or combination thereof, that connects, couples and/or otherwise communicates between the various components of the infotainment system 100, such as the infotainment platform 104, the one or more user devices 106, the one or more other vehicle components and/or the external database 108.

The infotainment system 100 includes an infotainment platform 104. The infotainment platform 104 obtains meeting information from the one or more user devices 106 and/or the external database 108. The infotainment system 100 may determine the location of the vehicle 102, the meeting location, the current date/time, and/or the meeting date/time. The infotainment system 100 may determine that the user, such as a driver, a passenger or other occupant of the vehicle 102, will be late for the meeting and notify other attendees of the meeting that the user will be late. The infotainment system 100 may automatically connect the user to the meeting when the meeting is about to begin and/or when the meeting begins. This ensure that the user does not miss the meeting.

The infotainment platform 104 has a processor, such as an electronic control unit (ECU) 112, a memory 114, a network access device 116, the user interface 118 and/or one or more other vehicle components. The ECU 112 may be implemented as a single ECU or as multiple ECUs. The ECU 112 may be electrically coupled to some or all of the other components within the vehicle 102, such as the memory 114, the network access device 116, the navigation unit 128, the user interface 118 and/or one or more other vehicle components. The one or more other vehicle components may include the motor and/or generator 120, the engine 122 and/or the battery 124. The ECU 112 may include one or more processors or controllers specifically designed for sensing, detecting, measuring and/or otherwise determining or obtaining the various parameters that are related to vehicle 102, such as parameters related speed of the vehicle 102, the location of the vehicle 102 and/or the current date/time. The ECU 112 may be coupled to a memory 114 and execute instructions that are stored on the memory 114.

The memory 114 may be coupled to the ECU 112 and store instructions that the ECU 112 executes. The memory 114 may include one or more of a Random Access Memory (RAM) or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112. The memory 114 may store one or more configuration settings that indicate whether to connect to a video conference or an audio conference when both are available. The one or more configuration settings may indicate whether to turn on or turn off the video when connecting to a video conference and/or another setting, such as the volume of the audio and/or a sensitivity of the microphone when connecting to a conference call. Other settings may include a brightness, a latency, a signal strength, a network bandwidth, a call quality or other setting or configuration of the video when connecting to a video conference.

Figure 4:
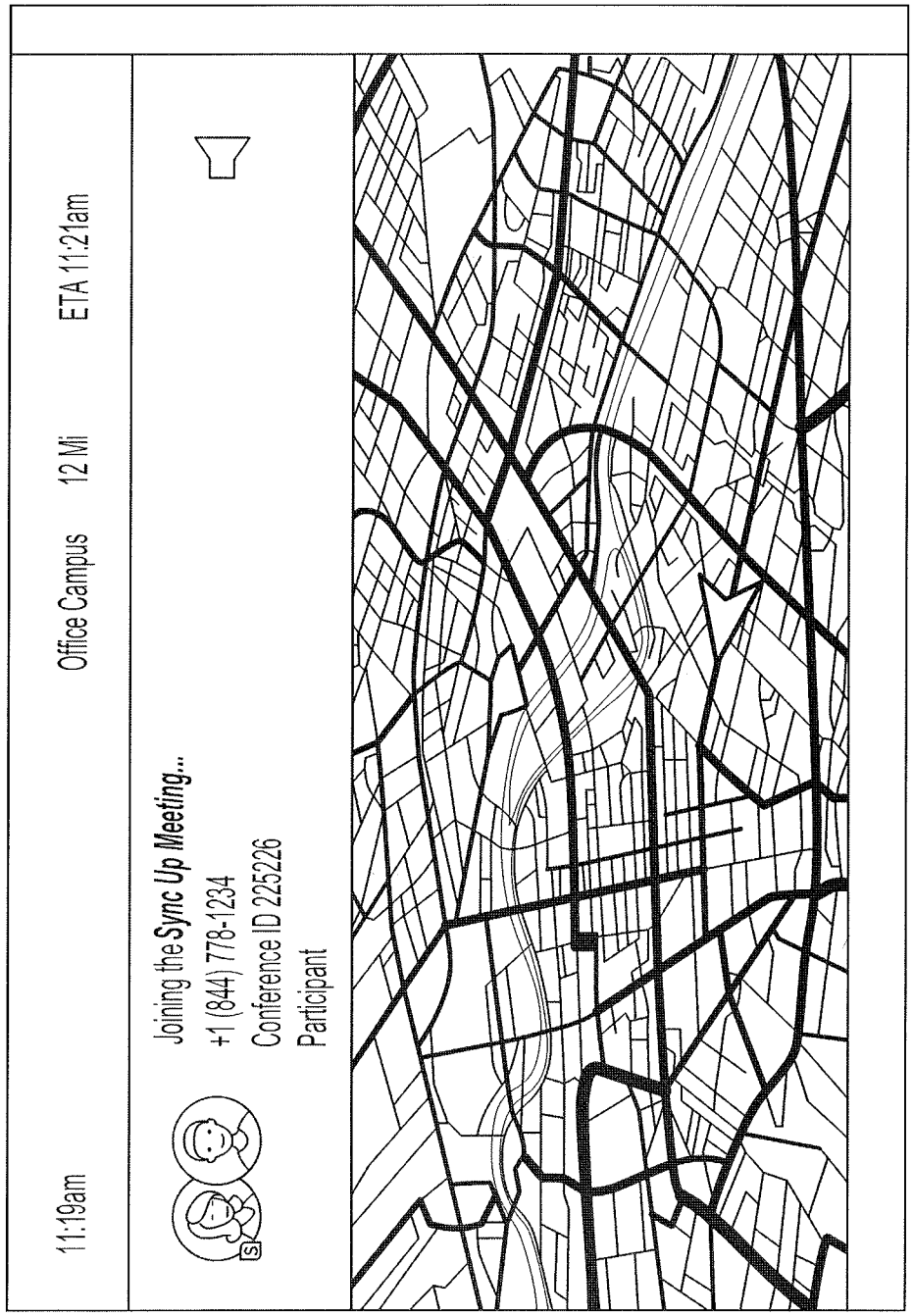
FIG. 4 shows an example meeting calendar notice being displayed on the user interface of the in-vehicle infotainment system of FIG. 1 according to an aspect of the invention.

The infotainment system 100 may include a user interface 118. The user interface 118 may be a dashboard interface positioned at the center of or within the driver-side dashboard and/or may be a heads-up display (HUD) positioned within a portion between the driver-side area and the passenger-side area in the front passenger compartment of the vehicle 102. In some implementations, the user interface 118 may be a rear seat interface positioned in front of a rear passenger and/or a portable device that could be used by occupants of the vehicle 102 including non-driver passengers. The infotainment system 100 may display one or more notifications, alerts, and/or screens with one or more videos related associated to a video conference. The one or more notifications or alerts may notify the user that there is an upcoming meeting, that a participant has joined a scheduled meeting and/or that a meeting has begun. For example, a notification may alert the user that a meeting is about to begin, as shown in FIG. 4.

The user interface 118 may include an input/output device that receives user input, such as a user interface element, a button, a dial, a microphone, a keyboard, or a touch screen, and/or provides output, such as a display 118b, a speaker 118a, an audio and/or visual indicator, or a refreshable braille display. The speaker 132 may be used to output audio associated with the audio conference and/or the video conference. The user interface 118 may receive user input that may include configuration settings for one or more user preferences, such as a selection of joining an audio conference or a video conference when both options are available, for example.

The infotainment system 100 may include a network access device 116. The network access device 116 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 116 may transmit data to and receive data from other entities, such as the external database 108 and/or the user device 106.

The infotainment system 100 may include a navigation unit 128. The navigation unit 128 may be integral to the vehicle 102 or a separate unit coupled to the vehicle 102, such as a navigation unit (not shown) within the user device 106. The navigation unit 128 may communicate with the vehicle 102 via the network access device 116. In some implementations, the vehicle 102 may include a Global Positioning System (GPS) unit (not shown) for detecting location data including a current location of the vehicle 102 and date/time information instead of the navigation unit 128. In that regard, the ECU 112 may perform the functions of the navigation unit 128 based on data received from the GPS unit. At least one of the navigation unit 128 or the ECU 112 may predict or propose a route set that includes a starting location and a destination location. The navigation unit 128 or the ECU 112 may perform navigation functions. Navigation functions may include, for example, route and route set prediction, identifying roadways, terrain features, and places of interest or other features, providing navigation instructions, speed limits on roadways, and accident notifications, and receiving user input such as verification of predicted routes and route sets or destinations.

The navigation unit 128 may provide and obtain navigational map information. The navigational map information may include a current location, a starting location, a destination location and/or a route between the starting location or current location and the destination location of the vehicle 102, and may include a memory (not shown) for storing route data. The navigation unit 128 may receive data from other sensors capable of detecting data corresponding to location information. For example, the other sensors may include a gyroscope or an accelerometer. The navigational map information may include other information, such as traffic information. The traffic information may include the positions or locations of other vehicles surrounding the vehicle 102, the density of traffic surrounding the vehicle 102 and/or along the route that the vehicle 102 is travelling, and/or roadway information, such as speed limits, road construction or other related events that may affect the speed of travel.

The infotainment system 100 may include one or more sensors 130. The one or more sensors 130 may include a vehicle speed sensor 130a, a microphone 130b, a camera 130c and/or a speaker 130d. The vehicle speed sensor 130a may detect or speed of the vehicle 102, such as by measuring the revolutions per minute of the wheels of the vehicle 102. The infotainment system 100 may use the speed to determine an estimated time of arrival to the destination, which may be the meeting location or a location that allows for the user to access and join the meeting. The microphone 130b may be an audio sensor that detects audio within the vehicle 102 to allow for transmission of the audio when connected to the video and/or audio conference. The camera 130c may be a video sensor that captures video images within the vehicle 102, and in particular, the camera 130c may capture video of the user to allow for transmission of the video when connected to a video conference.

The infotainment system 100 may couple, connect to, and/or include one or more vehicle components. The one or more vehicle components may include a motor and/or generator 120. The motor and/or generator 120 may convert electrical energy into mechanical power, such as torque, and may convert mechanical power into electrical energy. The motor and/or generator 120 may be coupled to the battery 124. The motor and/or generator 120 may convert the energy from the battery 124 into mechanical power, and may provide energy back to the battery 124, for example, via regenerative braking. In some implementations, the vehicle 102 may include one or more additional power generation devices such as the engine 122 or a fuel cell stack (not shown). The engine 122 combusts fuel to provide power instead of and/or in addition to the power supplied by the motor and/or generator 120.

The battery 124 may be coupled to the motor and/or generator 120 and may provide electrical energy to and receive electrical energy from the motor and/or generator 120. The battery 124 may include one or more rechargeable batteries.

The BMCU 126 may be coupled to the battery 124 and may control and manage the charging and discharging of the battery 124. The BMCU 126, for example, may measure, using battery sensors, parameters used to determine the state of charge (SOC) of the battery 124. The BMCU 126 may control the battery 124 to maintain a reserve power explicitly for providing a sudden burst of electrical energy to be converted into power for the transmission to drive or move the multiple wheels of the vehicle 102.

The infotainment system 100 may include one or more user devices 106. The one or more user devices 106 may be a personal device, such as a laptop, a computer, a smartphone or other computing device. The one or more user devices 106 may include its own processor, user interface, network access device, navigation unit or other similar components. The one or more user devices 106 may provide meeting information to the infotainment platform 104, which may then be stored in the memory 114 and used by the ECU 112 to determine when to notify the user of a meeting and/or to connect to the meeting.

The infotainment system 100 may include an external database 108. The external databases 108 may include many databases from different service providers. A service provider may provide information to the vehicle 102. Information provided by the service providers may include meeting information including a meeting date/time/location, video conferencing information and/or audio conferencing information.

A database is any collection of pieces of information that is organized for search and retrieval, such as by a computer, and the database may be organized in tables, schemas, queries, report, or any other data structures. A database may use any number of database management systems. The one or more external databases 104 may include a third-party server or website that stores or provides the meeting information. The information may be real-time information, updated periodically, or user-inputted. A server may be a computer in a network that is used to provide services, such as accessing files or sharing peripherals, to other computers in the network. A website may be a collection of one or more resources associated with a domain name. For example, the infotainment platform 104 may obtain the meeting information from a calendar on a third-party server and/or may access a third-party service to connect to the video and/or audio conference.

Figure 2:
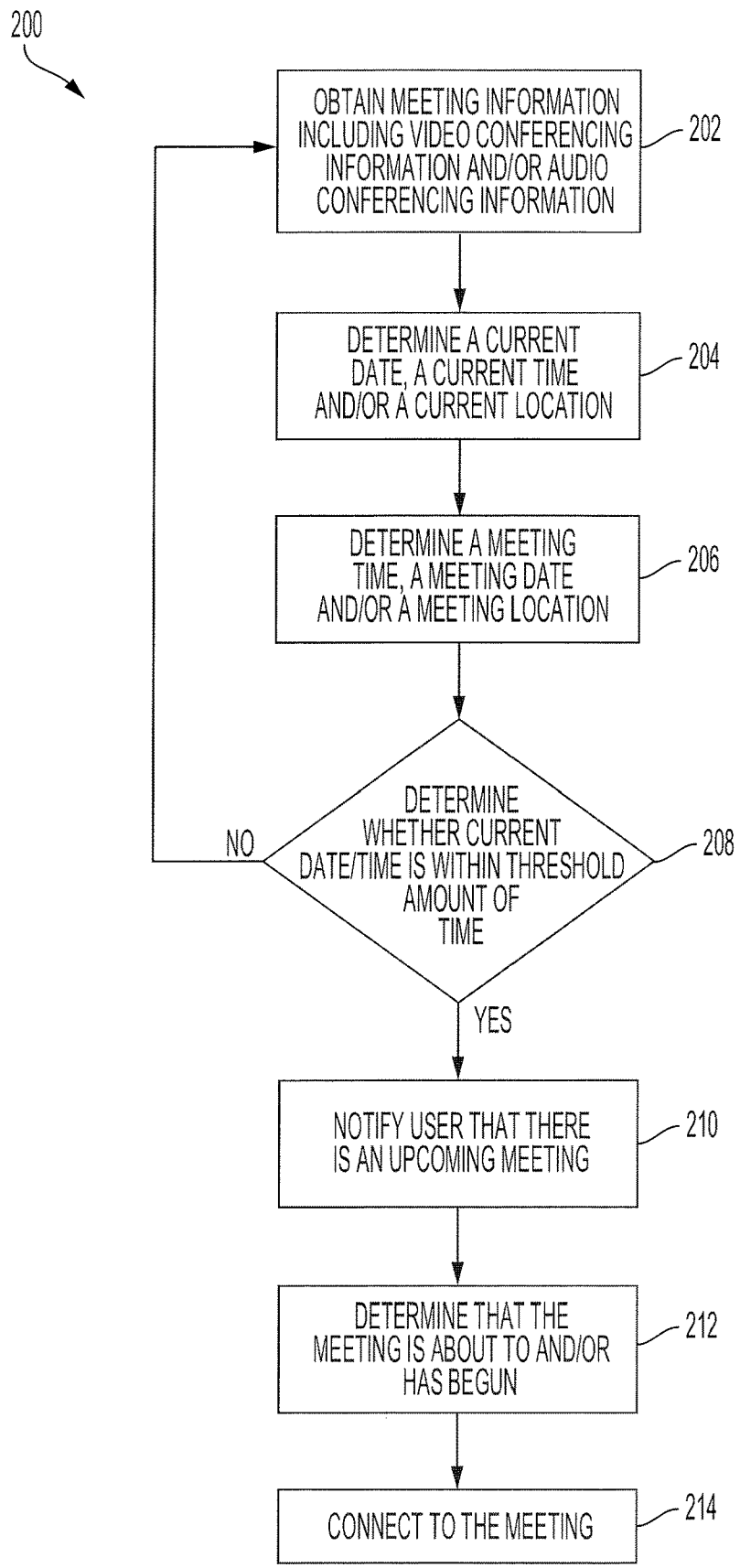
FIG. 2 is a flow diagram of an example process for determining whether to connect to an audio and/or a video conference using the in-vehicle infotainment system of FIG. 1 according to an aspect of the invention.

FIG. 2 is a flow diagram of a process 200 for determining whether to connect to an audio and/or a video conference. One or more computers or one or more data processing apparatuses, for example, the electronic control unit 112 of the infotainment system 100 of FIG. 1, appropriately programmed, may implement the process 200.

The infotainment platform 104 obtains meeting information (202). The infotainment platform 104 may obtain the meeting information from the one or more user devices 106. The infotainment platform 104 may obtain a signal that indicates that a user device 106 has connected or paired with the infotainment platform 104 via a wireless or a wired connection. Once the infotainment platform 104 obtains the signal, the infotainment platform 104 or an application stored in the memory 114 of the infotainment platform 104 may synchronize with an application and/or with the user device 106 to obtain the meeting information.

Figure 3:
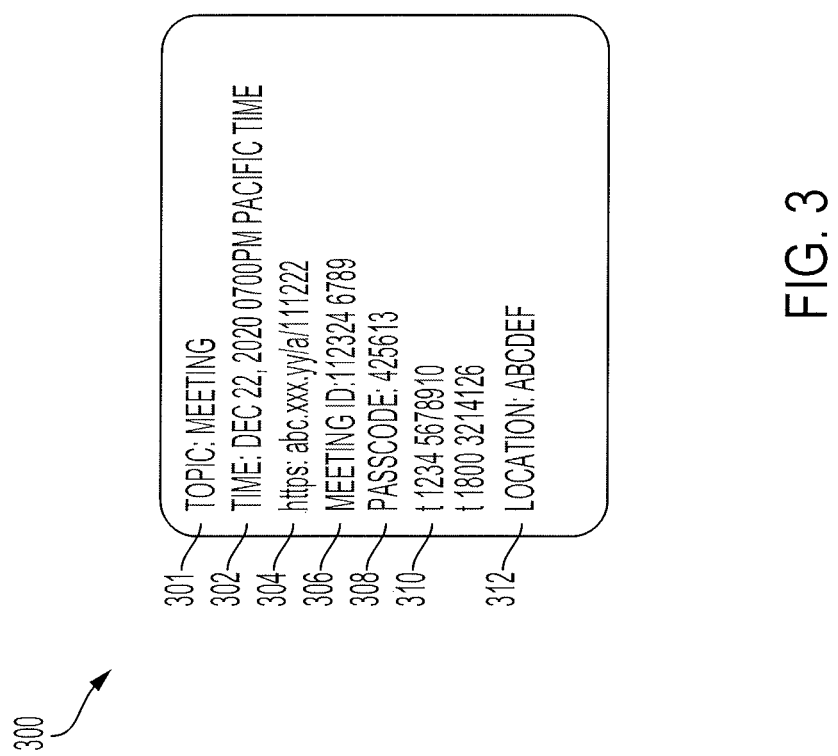
FIG. 3 shows an example meeting invitation or notice that is obtained using the in-vehicle infotainment system of FIG. 1 to connect to a meeting conference according to an aspect of the invention.

The meeting information, such as from a meeting invitation or notice 300, may include generic meeting information related to the meeting, such as name or subject 301, a meeting date/time 302 and/or a location 312 of the meeting, as shown in FIG. 3 for example. The meeting information may include other information, such as the participants of the meeting including a photo or an avatar and contact information including a phone number or an email address of the participants. The meeting information May include video conferencing information and/or audio conferencing information related to the meeting. The video conferencing information may include a resource link 304 that accesses and links to a video conferencing service, which provides both video and/or audio via data, a meeting identifier (or "meeting ID") 306 that indicates an identifier that identifies the meeting and/or a passcode identifier (or "passcode ID") 308. The passcode ID 308 may be a unique identifier to grant access to the meeting associated with the meeting ID 306. The video conferencing information may include a video conferencing platform identifier that identifies the video conferencing platform or service to use and connect to access the meeting. The video conferencing information may include one or more configuration settings, such as an option to turn on or turn off the video, an option to turn on or mute the audio and/or a volume audio and/or a sensitivity of a microphone. The video conferencing information may also include one or more phone numbers 310 to connect the audio, which may be used as an alternative to the resource link.

The audio information may similarly include the meeting ID 306, the passcode ID 308 and/or one or more configuration settings, such as an option to turn on or mute the audio and/or a volume of the audio and/or a sensitivity of a microphone. The audio conferencing information may also include one or more phone numbers 310 to connect to the audio conference.

The infotainment platform 102 may obtain or determine a current date, a current time and/or a current location of the vehicle 102 (204). The infotainment platform 102 may use the navigation unit 128 obtain navigation information, such as from a global positioning system, that includes the current date, the current time and/or the current location of the vehicle 102. In some implementations, the infotainment platform 102 may have an internal clock that maintains the current time and/or the current date. In some implementations, the infotainment platform 104 may synchronize with the user device 106, such as the navigation system of the user device 106, and obtain the current date, the current time and/or the current location of the vehicle 102.

The infotainment platform 104 may determine a meeting date/time and/or a meeting location or other destination (206). The infotainment platform 104 may extract the meeting date/time and/or the meeting location 206 from the meeting information. For example, the infotainment platform 104 may parse the meeting information and extract the meeting date/time and/or the meeting location from the meeting information so that the infotainment platform 104 may determine whether the occupant may be late or is late for a meeting.

The infotainment platform 104 determines whether current date/time is within a threshold amount of time of the meeting date/time (208). The infotainment platform 104 compares the current date/time to the meeting date/time. And if the current date is the same as the meeting date and the current time is the same as the meeting time or within the threshold amount of time, such as approximately 15 minutes, before the meeting time, the infotainment platform 104 may notify the user that there is an upcoming meeting. Otherwise, if the current date is different than the meeting date and/or the current time is past the meeting time or not within the threshold amount of time before the meeting time, the infotainment platform 104 may continue to obtain meeting information (202) and/or determine the current date/time (204).

The infotainment platform 104 may notify the user that there is an upcoming meeting (210). The infotainment platform 104 may notify the user that there is an upcoming meeting when the current date/time is the same as the meeting date/time or within the threshold amount of time before the meeting time. The infotainment platform may display the notification that indicates that there is an upcoming meeting on a display, such as on a display of the user interface 118, as shown in FIG. 4 for example.

The infotainment platform 104 may determine that the meeting is about to and/or has begun (212). The infotainment platform 104 may compare the current date/time with the meeting date/time and if the current date/time is within a second threshold amount of time, such as within a minute, of the meeting date/time, is the same as the meeting date/time or after the meeting date/time, the infotainment platform 104 may determine that the meeting is about to and/or has begun.

Figure 5:
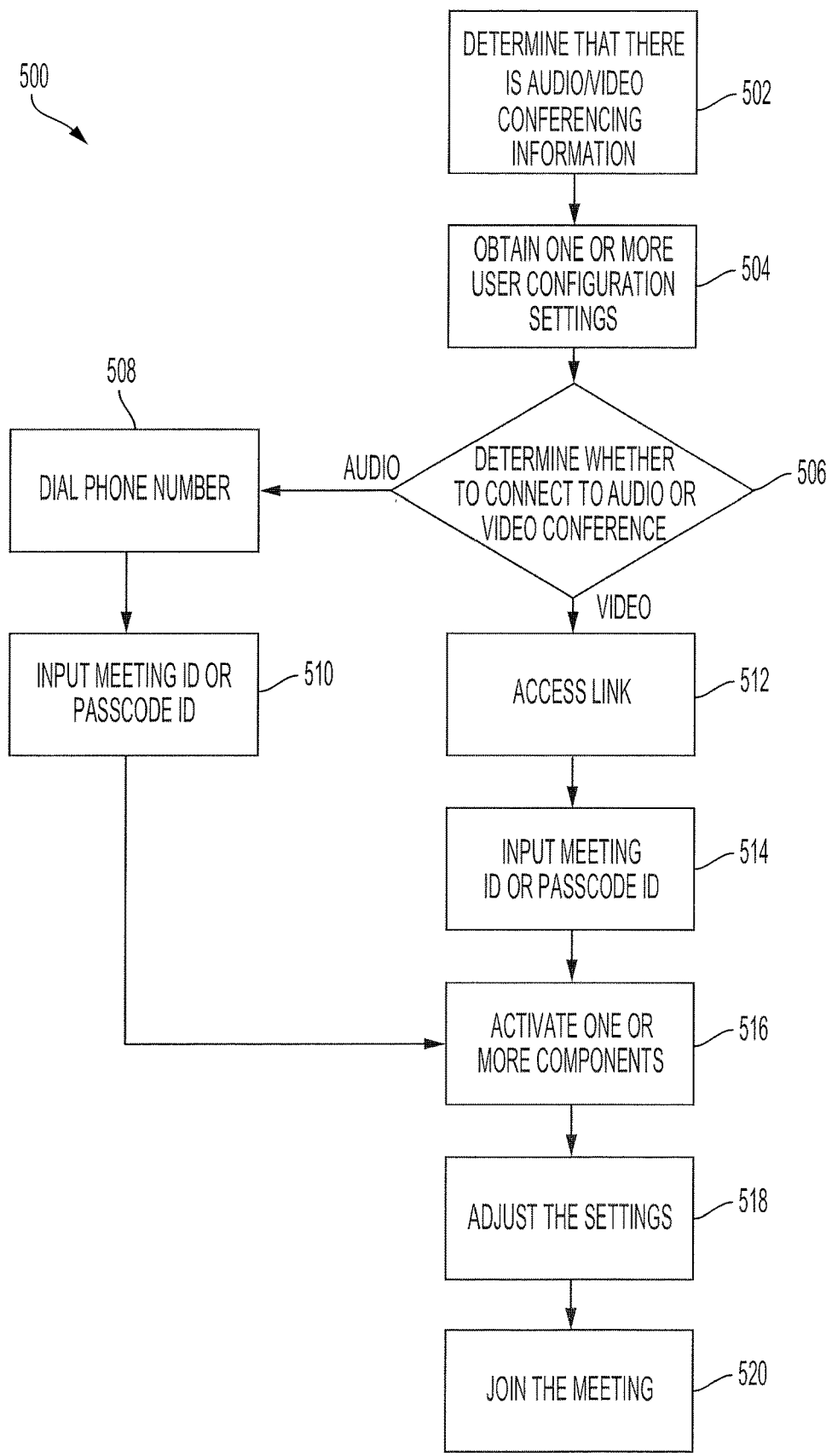
FIG. 5 is an example flow diagram of a process for connecting to the audio and/or video conference using the in-vehicle infotainment system of FIG. 1 according to an aspect of the invention.

Once the infotainment platform 104 has determined that the meeting is about to and/or has begun, the infotainment platform 104, the infotainment platform may connect to the meeting (214). The infotainment platform 104 may connect to the meeting when there is audio conferencing information and/or video conferencing information. The infotainment platform may parse the meeting information to determine whether there is video and/or audio conferencing information included within the meeting information. FIG. 5 describes the process 500 for connecting the audio and/or video conferencing information.

FIG. 5 is a flow diagram of a process 500 for connecting to the audio and/or a video conference. One or more computers or one or more data processing apparatuses, for example, the electronic control unit 112 of the infotainment system 100 of FIG. 1, appropriately programmed, may implement the process 500.

When the infotainment platform 104 has obtained the meeting information and determined that the meeting is about to and/or has begun, as described above, the infotainment platform 104 may determine that there is audio/video conferencing information included within the meeting information (502). The infotainment platform may parse the meeting information to determine whether audio conferencing information and/or video conferencing information is included within the meeting information. The infotainment platform 104 may use the format of the meeting information and/or patterns within the meeting information to identify audio conferencing information, video conferencing information and/or generic meeting information included within the meeting information. For example, a resource link 304 may begin with an "http" header or a "www" header or may include a top-level domain name, such as ".com" or ".net", and so, the infotainment platform 104 may identify the resource link 304 by searching for the header or top-level domain name. In another example, a presence of a hyperlink may also be associated with a resource link 304. Moreover, once a resource link 304 is identified, the infotainment platform 104 may determine that there is video conferencing capability based on the presence of the resource link 304.

In another example, one or more phone numbers 310 may begin with a "+" and be followed by and represented by numbers and/or special characters. The infotainment platform 104 may determine that there is audio conferencing capability based on the presence of the "+" followed by consecutive numbers and/or special characters. Other fields, such as "meeting ID" followed by numbers and/or characters, and/or "passcode" followed by numbers and/or characters, may indicate that there is some type of conferencing capability.

The infotainment platform 104 may obtain one or more user configuration settings (504). The infotainment platform 104 may obtain the one or more user configuration settings from the memory 114. The one or more user configuration settings may include settings to default to the video conference or the audio conference when both are available. The one or more user configuration settings may include settings for the volume of the outputted audio via the speaker and/or the sensitivity of the inputted audio from the microphone 130b. Other configuration settings may include turning on or turning off the camera 130c when beginning a video conference.

The infotainment platform 104 may determine whether to connect to the audio conference or the video conference (506). The infotainment platform 104 may activate the audio conference or the video conference based on the presence or lack of presence of the video conferencing information and/or the audio conferencing information. For example, when infotainment platform 104 determines that there is video conferencing information included within the meeting information, the infotainment platform 104 may determine to connect to the video conference. And when there is audio conferencing information included within the meeting information, the infotainment platform 104 may determine to connect to the audio conference. Moreover, when there is both video conferencing information and audio conferencing information, the infotainment platform 104 may determine to connect to either the video conference or the audio conference or a combination of both based on the one or more user configuration settings that indicate which one of the audio conference, the video conference or both to connect to.

In some implementations, the infotainment platform 104 may activate and connect to the audio conference or the video conference based on the network bandwidth and/or the signal strength. The network bandwidth and/or the signal strength may be based on the connection between the infotainment platform 104 and audio/video conferencing service via the network 110 when the infotainment platform 104 directly connects with the audio/video conferencing service and/or between the infotainment platform 104, the user device 106 and the audio/video conferencing service when the infotainment platform 104 connects to the audio/video conferencing service indirectly through the user device 106 using the network 110. If the network bandwidth and/or the signal strength is greater than a threshold amount, which represents a sufficient bandwidth and/or signal strength to maintain a stable video conferencing call, the infotainment platform 104 may determine to connect to the video conference. Otherwise, the infotainment platform 104 may default to connect to the audio conference.

Moreover, the infotainment platform 104 may activate and connect to the audio conference or the video conference based on a current location of the vehicle 102 and navigational map information. The navigational map information may include information regarding known poor network areas, and the infotainment platform 104 may activate and connect to the audio conference when the current location of the vehicle 102 is within a known poor network. This allows the infotainment platform 104 to connect to the video conference when feasible due to network bandwidth and/or signal strength constraints and connect to the audio conference otherwise.

When the infotainment platform 104 determines to connect to the audio conference, the infotainment platform 104 may dial the phone number included within the audio conferencing information that accesses the audio conferencing service (508). The infotainment platform 104 may dial the phone number using the user device 106 or other application and connect to the audio conference. The infotainment platform 104 may dial the phone number using the user device 106, an application stored within the memory 114 using the electronic control unit 112 or other application or device based on one or more user settings or preferences. For example, the infotainment platform 104 may cause the user device 106 to dial the phone number or execute an application that connects to the network 110 directly to dial and connect to the audio conference. In some implementations, the one or more user settings or preferences may indicate to dial using the user device 106 when the meeting information is obtained from a personal calendar and/or may indicate to dial using the application that connects to the network 110 directly when the meeting information is obtained from a business calendar.

Once connected to the audio conferencing service, the infotainment platform 104 may automatically input the meeting ID and/or the passcode ID when prompted or requested from the audio conferencing service (510). The infotainment platform 104 may recognize one or more audio prompts that indicate that user input is needed and automatically dial or output the audio tones or signals corresponding to the numbers of the meeting ID and/or the passcode ID when prompted to automatically connect to the audio conference without user input. In some implementations, the infotainment platform 104 may output the audio prompts to notify the user that user input is necessary to connect to the audio conference. The infotainment platform 104 may wait to receive user input either via the user interface 118 or from the user device 106 to connect into the audio conference meeting.

When the infotainment platform 104 determines to connect to the video conference, the infotainment platform 104 may access the resource link or other hyperlink included within the video conferencing information that accesses the video conferencing service (512). The infotainment platform 104 may select the resource link or hyperlink, which opens a web browser on the user interface 118 and/or on the user device 106. In some implementations, the infotainment platform 104 may copy the address of the resource link or the address of the hyperlink and input the address of the resource link or the address of the hyperlink into the web browser to access the video conferencing service. Since the infotainment platform 104 uses the provided resource link or hyperlink, the infotainment platform 104 may access various different types of video conferencing service without storing a corresponding application that is video conferencing service specific. Thus, the infotainment platform 104 may not be video conferencing and/or audio conferencing platform-specific and may be compatible to access multiple types of video and/or audio conferencing services.

In some implementations, the infotainment platform 104 may have one or more application programming interfaces with different video conferencing services. The infotainment platform 104 may identify the appropriate video conferencing service to access based on the meeting information, such as the video conferencing platform identifier or a format of the video conferencing information within the meeting information, which may identify the video conferencing service. And, the infotainment platform 104 may connect to the video conferencing service that is identified using the corresponding application programming interface.

In some implementations, the infotainment platform 102 may cause the user device 106 to connect and join the video conference so that the connection is established by the user device 106. Once connected, the infotainment platform 102 may receive the video and/or audio from the user device 106, but allow for user interaction to be done via the infotainment platform 102 and/or the user device 106.

Once connected to the video conferencing service, the infotainment platform 104 may automatically input the meeting ID and/or the passcode ID when prompted or requested from the video conferencing service (514). The infotainment platform 104 may recognize one or more audio/video prompts that indicate that user input is needed and automatically provide the numbers of the meeting ID and/or the passcode ID when prompted to automatically connect to the video conference without user input. In some implementations, the infotainment platform 104 may output the audio/video prompts to notify the user that user input is necessary to connect to the video conference. The infotainment platform 104 may wait to receive user input either via the user interface 118 or from the user device 106 to connect into the video conference meeting.

Once connected to the audio conference and/or video conference, the infotainment platform 104 may activate one or more components, such as the camera 130c, the microphone 130b, the speakers and/or display of the user interface 118 (516). The infotainment platform 104 may adjust the settings of the audio conference and/or video conference based on the one or more user settings (518). The infotainment platform 104 may activate and control the microphone 130b, the camera 130c and/or the user interface 118 based on the one or more user settings. For example, the infotainment platform 104 may adjust the sensitivity of the microphone 130b, the brightness or sensitivity of the display of the user interface 118, the volume of the speaker, turning on or off the video, and/or other settings prior to joining the audio or video meeting. This allows the user to automatically join the video and/or audio conference meeting while driving without being distracted and having to provide user input. Once the one or more components are activated and the one or more settings are adjusted, the infotainment platform 104 may join the audio or video meeting (520). The infotainment platform 104 may output the video for a video conference onto a display of the user interface 118 and/or the display of the user device 106. In some implementations, the infotainment platform 104 may output the video through a virtual reality (VR) headset or other VR device for the video conference. The infotainment platform 104 may output the audio through the speakers of the vehicle 102 and/or through the speakers or headset of the user device 106.

Figure 6:
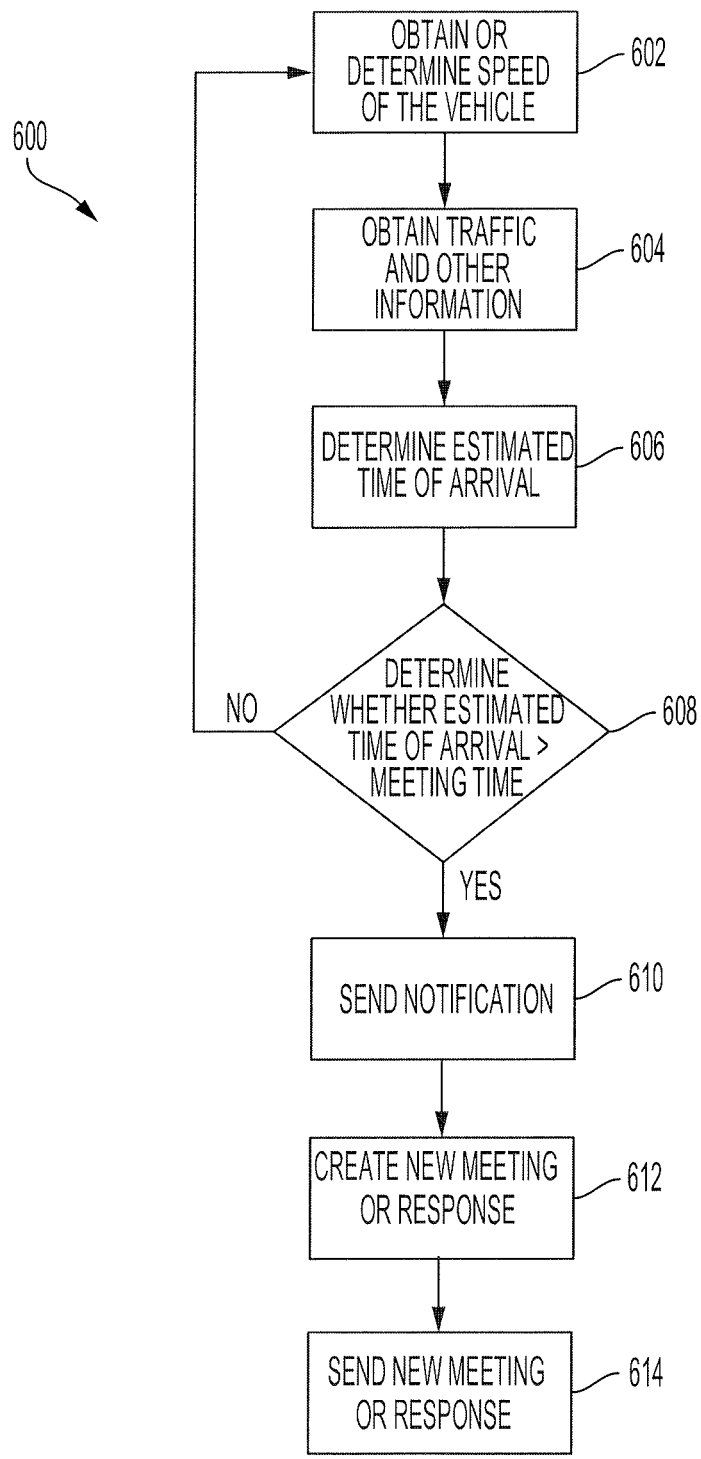
FIG. 6 is an example flow diagram of a process for notifying participants of the meeting that the user will be late to the meeting using the in-vehicle infotainment system of FIG. 1 according to an aspect of the invention.

FIG. 6 is a flow diagram of a process 600 for notifying participants of the meeting that the user will be late to the meeting. One or more computers or one or more data processing apparatuses, for example, the electronic control unit 112 of the infotainment system 100 of FIG. 1, appropriately programmed, may implement the process 600.

Once the meeting information has been obtained including the meeting location or destination and the meeting date/time, the infotainment platform 104 may obtain or determine the speed of the vehicle 102 along with the current date, the current time and/or the current location, as described above (602). The infotainment platform 104 may use a vehicle speed sensor 130a to measure or detect the speed of the vehicle 102. In some implementations, the infotainment platform 104 may calculate the speed of the vehicle 102 using the navigation unit 128. For example, the infotainment platform 104 may calculate the difference traveled between two point along with the amount of time taken to travel between the two points to calculate the speed of the vehicle 102.

The infotainment platform 104 may obtain traffic information and other information, such as weather information (604). The infotainment platform 104 may obtain the traffic information and/or other information from the external database 108, another vehicle on the road via wireless communication (e.g. V2V), and/or an infrastructure device along the roadway via wireless communication (e.g. I2V) or extract the traffic information and/or other information from the navigational map information obtained from the navigation unit 128. The traffic information and/or other information may be used to calculate an estimated time of arrival to the destination.

The infotainment platform 104 may determine or calculate an estimated time of arrival to the destination (606). The infotainment platform may determine or calculate the estimated time of arrival based on the traffic information, the speed of the vehicle 102, the current location of the vehicle 102 and/or the current date/time. For example, the infotainment platform 104 may determine a route based on the current location and the destination or meeting location and calculate the distance between the destination or meeting location and the current location via the route and divide the distance by the speed of the vehicle 102 while accounting for the traffic information and other information to arrive at an estimated amount of time to reach the destination or meeting location, which may be added to the current date/time to determine the estimated time of arrival. Other factors that may be included to determine the estimated time of arrival includes road information, such as speed limits, traffic flow or construction of the roadways along the route and weather.

The infotainment platform 104 may determine whether the estimated time of arrival is greater than (e.g. past or after) the meeting time (608). In some implementations, the infotainment platform 104 may only determine whether the estimated time of arrival is greater than the meeting time when the current date/time is already within the threshold amount of time, as described above. If the estimated time of arrival is less than (e.g., prior to or before) the meeting time, the infotainment platform 104 may determine that the user will arrive at their destination prior to the meeting and may be able to join the meeting after the user reaches their destination. The infotainment platform 104 may continue to monitor the speed of the vehicle 102 and other factors to ensure that the user reaches the destination prior to the meeting beginning (602). Otherwise, if the estimated time of arrival is greater than the meeting time, the infotainment platform 104 may determine that the user will arrive at their destination after the meeting begins, and the infotainment platform 104 may send a notification to one or more participants of the meeting to indicate to them that the user will be late for the meeting and/or provide them with the estimated time of arrival of the user (610). In some implementations, the infotainment platform 104 may indicate to the other participants that the user intends, to join the meeting via the video or audio conference and that the video or audio conference should be used to hold the meeting. The infotainment platform 104 may use the user device 106 to send the notification and/or may send the notification directly.

The infotainment platform 104 may create a new meeting notification or response (612). The infotainment platform 104 may use voice recognition or typed user input from a touchscreen of the user interface 118 and/or from the user device 106 to create the new meeting. The infotainment platform 104 may send the new meeting, or response to the one or more participants of the meeting has begun to reschedule the meeting in response to the user being late to the meeting that has begun (614).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An in-vehicle infotainment platform, comprising:
   a memory that stores (i) meeting information including at least one of video conferencing information or audio conferencing information of a meeting and (ii) map information including data corresponding to one or more geographic areas and relating to whether each of the one or more geographic areas satisfies a threshold network condition sufficient for maintaining a video conference of the meeting;
   a speed sensor that detects a speed of a vehicle;
   a user interface including one or more components; and
   an electronic control unit that is coupled to the memory, the speed sensor, and the user interface and that:
      determines an estimated time of arrival of the vehicle at a destination location based on a current location of the vehicle and the detected speed of the vehicle,
      automatically connects, in response to a determination that the estimated time of arrival of the vehicle at the destination location is within a threshold amount of time before a time of the meeting, to the video conference of the meeting using the video conferencing information when the destination location is part of one of the one or more geographic areas that satisfies the threshold network condition or an audio conference of the meeting when the destination location is part of another one of the one or more geographic areas that does not satisfy the threshold network condition, and
      activates and controls at least one of the one or more components of the user interface when the video conference or the audio conference of the meeting is connected.

2. The in-vehicle infotainment platform of claim 1, wherein the electronic control unit further:
   determines whether to connect to the video conference or the audio conference based on the meeting information.

3. The in-vehicle infotainment platform of claim 1, wherein the meeting information further includes a date and the time of the meeting, wherein the electronic control unit further:
   determines that a current date and a current time are within a threshold amount of time of the date and the time of the meeting; and
   automatically connects to the video conference using the video conferencing information when the meeting information includes the video conferencing information.

4. The in-vehicle infotainment platform of claim 3, wherein the video conferencing information includes a meeting identifier and an indication of a video conferencing platform, wherein to automatically connect to the video conference using the video conferencing information the electronic control unit:
   identifies the meeting identifier;
   selects a link or runs an application to connect to the video conference using the video conferencing platform; and
   connects to the video conference using the meeting identifier.

5. The in-vehicle infotainment platform of claim 1, further comprising:
   a display that outputs video associated with the video conference;
   a speaker that outputs audio associated with the video conference; and
   a microphone that receives the audio associated with the video conference.

6. The in-vehicle infotainment platform of claim 1, wherein the electronic control unit:
   automatically connects to the audio conference using the audio conferencing information when the meeting information includes the audio conferencing information.

7. The in-vehicle infotainment platform of claim 6, wherein the audio conferencing information includes a phone number, wherein to automatically connect to the audio conference using the audio conferencing information the electronic control unit:
  causes a mobile device to dial the phone number.
8. The in-vehicle infotainment platform of claim 7, wherein to automatically connect to the audio conference using the audio conferencing information the electronic control unit:
  causes transmission of a passcode to connect to the audio conference.
9. An in-vehicle infotainment platform, comprising:
  a memory that stores (i) meeting information including at least one of video conferencing information or audio conferencing information of a meeting and (ii) map information including data corresponding to one or more geographic areas and relating to whether each of the one or more geographic areas satisfies a threshold network condition sufficient for maintaining a video conference of the meeting;
  a speed sensor that detects a speed of a vehicle;
  a user interface including one or more components, at least a first component of which enables an audio communication and at least a second component of which enables a video communication; and
  an electronic control unit that is coupled to the memory, the speed sensor, and the user interface and that:
    determines an estimated time of arrival of the vehicle at a destination location based on a current location of the vehicle and the detected speed of the vehicle,
    automatically connects, in response to a determination that the estimated time of arrival of the vehicle at the destination location is within a threshold amount of time before or after a time of the meeting, to the video conference of the meeting at the time of the meeting or at the estimated time of arrival using the video conferencing information when the destination location is part of one of the one or more geographic areas that satisfies the threshold network condition or an audio conference of the meeting using the audio conferencing information when the destination location is part of another one of the one or more geographic areas that does not satisfy the threshold network condition, and
    activates and controls at least one of the one or more components of the user interface when the video conference or the audio conference of the meeting is connected.
10. The in-vehicle infotainment platform of claim 9, wherein the meeting information includes a date and the time of the meeting, wherein the electronic control unit further:
  determines that a current date and a current time are within a threshold amount of time of the date and the time of the meeting; and
  automatically connects to the video conference using the video conferencing information when the meeting information includes the video conferencing information.
11. The in-vehicle infotainment platform of claim 10, wherein the video conferencing information includes a meeting identifier and an indication of a video conferencing platform, wherein to automatically connect to the video conference using the video conferencing information the electronic control unit:
  identifies the meeting identifier;
  selects a link or runs an application to connect to the video conference using the video conferencing platform; and
  connects to the video conference using the meeting identifier.
12. The in-vehicle infotainment platform of claim 9, further comprising:
  a display that outputs video associated with the video conference; and
  a speaker that outputs audio associated with the video conference.
13. The in-vehicle infotainment platform of claim 9, wherein the electronic control unit:
  automatically connects to the audio conference using the audio conferencing information when the meeting information includes the audio conferencing information.
14. The in-vehicle infotainment platform of claim 13, wherein the audio conferencing information includes a phone number, wherein to automatically connect to the audio conference using the audio conferencing information the electronic control unit:
  causes a mobile device to dial the phone number.
15. The in-vehicle infotainment platform of claim 9, wherein the electronic control unit determines whether to connect to the video conference or the audio conference further based on a configuration setting.
16. A method for connecting to a video conference using an in-vehicle infotainment platform on a vehicle, comprising:
  obtaining, by a processor, meeting information that includes a time of a meeting and video conferencing information including a meeting identifier and an indication of a video conferencing platform;
  obtaining, by the processor, map information including data corresponding to one or more geographic areas and relating to whether each of the one or more geographic areas satisfies a threshold network condition sufficient for maintaining the video conference of the meeting;
  detecting, by a speed sensor coupled to the processor, a speed of the vehicle;
  determining, by the processor, an estimated time of arrival of the vehicle at a route a destination location based on a current location of the vehicle and the detected speed of the vehicle;
  automatically connecting, by the processor and in response to determining that the estimated time of arrival of the vehicle at the destination location is within a threshold amount of time before the time of the meeting, to the video conference of the meeting at the time of the meeting using the meeting identifier and the video conferencing platform when the destination location is part of one of the one or more geographic areas that satisfies the threshold network condition; and
  activating and controlling, by the processor, at least one of one or more components of a user interface in data communication with the processor based on the meeting information.
17. The method of claim 16, wherein automatically connecting to the video conference includes:
  selecting a link or running an application to connect to the video conference using the video conferencing platform; and
  connecting to the video conference using the meeting identifier.
18. The method of claim 17, wherein connecting to the video conference using the meeting identifier includes automatically providing the meeting identifier to the video conferencing platform.

19. The method of claim 16, further comprising:
outputting, by the processor and on a display, video associated with the video conference; and
outputting, by the processor and using a speaker, audio associated with the video conference.

20. The method of claim 16, further comprising:
receiving, by the processor and using a microphone, audio from a user of the in-vehicle infotainment platform that is within the vehicle;
receiving, by the processor and using a camera, video of the user of the in-vehicle infotainment platform that is within the vehicle; and
sending, by the processor, the audio and the video to one or more devices associated with other participants of the video conference.

* * * * *